United States Patent
Hondo

(10) Patent No.: US 10,037,188 B2
(45) Date of Patent: Jul. 31, 2018

(54) ARITHMETIC PROCESSING DEVICE AND METHOD OF CONTROLLING ARITHMETIC PROCESSING DEVICE

(71) Applicant: FUJITSU LIMITED, Kawasaki-shi, Kanagawa (JP)

(72) Inventor: Mikio Hondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 236 days.

(21) Appl. No.: 15/204,304

(22) Filed: Jul. 7, 2016

(65) Prior Publication Data
US 2017/0017466 A1   Jan. 19, 2017

(30) Foreign Application Priority Data

Jul. 16, 2015  (JP) ................................ 2015-141912

(51) Int. Cl.
*G06F 7/483*    (2006.01)
*G06F 7/556*    (2006.01)

(52) U.S. Cl.
CPC ............ *G06F 7/4833* (2013.01); *G06F 7/556* (2013.01); *G06F 2207/483* (2013.01)

(58) Field of Classification Search
None
See application file for complete search history.

(56) References Cited

U.S. PATENT DOCUMENTS

| | | | |
|---|---|---|---|
| 5,604,691 A | 2/1997 | Dworkin et al. | |
| 6,772,181 B1 * | 8/2004 | Fu ........................ | G06F 17/17 708/290 |
| 6,877,020 B1 * | 4/2005 | Bratt ....................... | G06F 7/785 708/400 |
| 7,539,717 B2 | 5/2009 | Hussain | |
| 7,814,137 B1 * | 10/2010 | Mauer ................ | H03H 17/0225 708/300 |

(Continued)

FOREIGN PATENT DOCUMENTS

JP       2008-502036     1/2008
WO    WO 2013/145276 A1    10/2013

OTHER PUBLICATIONS

Extended European Search Report dated Dec. 1, 2016 in related European Application No. 16179328.6.

(Continued)

*Primary Examiner* — Michael D. Yaary
(74) *Attorney, Agent, or Firm* — Staas & Halsey LLP

(57) ABSTRACT

An arithmetic processing device includes: a first memory configured to store values of a first coefficient of a logarithmic function, where the logarithmic function is decomposed into a series operation term and the coefficient term, depending on respective values of a first bit group included in operand data of a first instruction to calculate the value of the first coefficient; a second memory configured to store values of a second coefficient included in the series operation term depending on the respective values of the first bit group included in operand data of a second instruction to calculate the value of the second coefficient; and a selector configured to select the value of the first coefficient read from the first memory based on the execution of the first instruction and select the value of the second coefficient read from the second memory based on the execution of the second instruction.

8 Claims, 9 Drawing Sheets

(56) References Cited

U.S. PATENT DOCUMENTS

2005/0131975 A1\* 6/2005 Okutani ............... G06F 17/142
    708/400
2005/0273481 A1   12/2005 Dent
2014/0379772 A1   12/2014 Hondo

OTHER PUBLICATIONS

Oriol Vinyals et al., "A Hardware-Independent Fast Logarithm Approximation with Adjustable Accuracy", Tenth IEEE International Symposium on Multimedia, Dec. 15, 2008, pp. 61-65.

\* cited by examiner

FIG. 5

| COEFFICIENT TO BE CALCULATED | INSTRUCTION IN CASE WHERE COEFFICIENT COMPUTING SECTION 26 IS USED | INSTRUCTIONS IN CASE WHERE COEFFICIENT COMPUTING SECTION 26 IS NOT USED |
|---|---|---|
| $\log(1 + f[51:46] / 2^{\wedge}6)$ EXPRESSED IN EQUATION (4) | flogad    x, Tlog | stdf    x, [ ]<br>ldx    [ ], xi<br>srlx    xi, 46 − 3, Tloge<br>and    Tloge, 0x3f << 3, Tlogo<br>lddf    [Tlogb + Tlogo], Tlog |
| $1 / (1 + f[51:46] / 2^{\wedge}6)$ EXPRESSED IN EQUATION (5) | frad1    x, Tr1 | stdf    x, [ ]<br>ldx    [ ], xi<br>srlx    xi, 46 − 3, Tre<br>and    Tre, 0x3f << 3, Tro<br>lddf    [Trb + Tro], Tr1 |

US 10,037,188 B2

ARITHMETIC PROCESSING DEVICE AND METHOD OF CONTROLLING ARITHMETIC PROCESSING DEVICE

CROSS-REFERENCE TO RELATED APPLICATION

This application is based upon and claims the benefit of priority of the prior Japanese Patent Application No. 2015-141912, filed on Jul. 16, 2015, the entire contents of which are incorporated herein by reference.

FIELD

The embodiments discussed herein are related to an arithmetic processing device and a method of controlling the arithmetic processing device.

BACKGROUND

For arithmetic processing devices such as processors, a method of computing a logarithmic function by decomposing the logarithmic function into multiple vice functions and referencing reference tables corresponding to the vice functions at stages of a pipeline has been proposed (refer to, for example, Japanese National Publication of International Patent Application No. 2008-502036). In addition, for arithmetic processing devices, a method of computing an exponential by calculating a coefficient using a table in a case where the exponential is decomposed into a Taylor series operation term and a coefficient term for the Taylor series operation term and computed has been proposed (refer to, for example, International Publication Pamphlet No. WO2013/145276).

For example, a logarithmic function may be decomposed into a Taylor series operation term and a coefficient term for the Taylor series operation term and thereby computed using a Taylor series operation, while the Taylor series operation term is expressed by a Taylor series operation and converses to a value expressed by a finite degree with predetermined precision. Thus, if the Taylor series operation term is truncated to a certain finite degree, predetermined precision is obtained. However, traditionally, since a process of calculating a coefficient is executed in accordance with a combination of multiple instructions such as an instruction to transfer data, an instruction to compute bits, and a shift operation instruction, the computation of the logarithmic function that is executed using the Taylor series operation reduces the processing performance of the arithmetic processing devices.

According to an aspect, an arithmetic processing device and a method of controlling the arithmetic processing device aim to compute a logarithmic function using a series operation at a higher speed than conventional techniques.

SUMMARY

According to an aspect of the invention, an arithmetic processing device includes: a first memory configured to store values of a first coefficient of a logarithmic function, where the logarithmic function is decomposed into a series operation term and the coefficient term, depending on respective values of a first bit group included in operand data of a first instruction to calculate the value of the first coefficient; a second memory configured to store values of a second coefficient included in the series operation term depending on the respective values of the first bit group included in operand data of a second instruction to calculate the value of the second coefficient; and a selector configured to select the value of the first coefficient read from the first memory based on the execution of the first instruction and select the value of the second coefficient read from the second memory based on the execution of the second instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of instructions to calculate values of coefficients expressed in Equations (4) and (5);

DESCRIPTION OF EMBODIMENTS

Hereinafter, embodiments are described with reference to the accompanying drawings.

Figure 1:
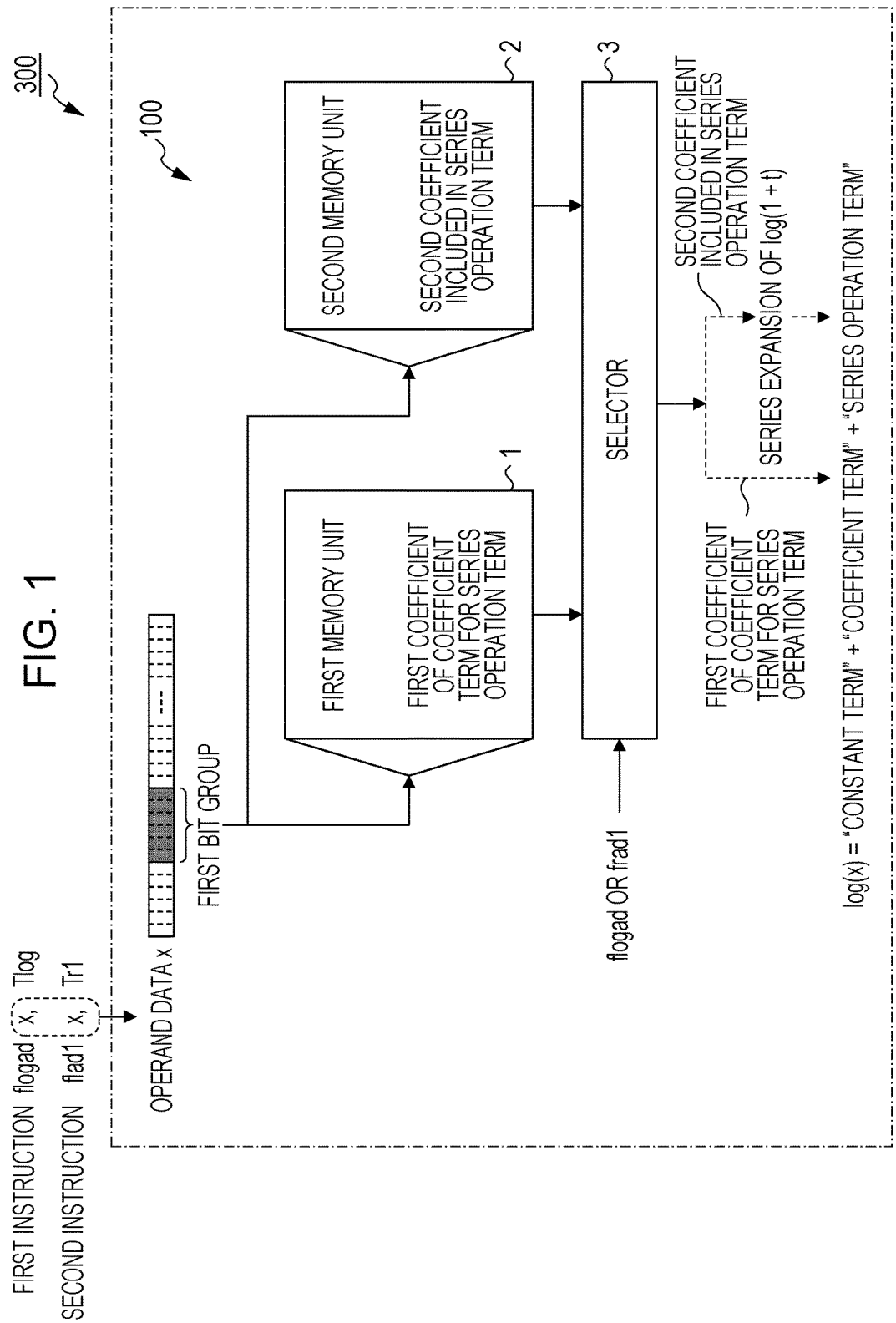
FIG. 1 is a diagram illustrating an embodiment of an arithmetic processing device and a method of controlling the arithmetic processing device.

FIG. 1 illustrates an embodiment of an arithmetic processing device and a method of controlling the arithmetic processing device. An arithmetic processing device 100 illustrated in FIG. 1 includes a first memory unit 1, a second memory unit 2, and a selector 3. The arithmetic processing device 100 illustrated in FIG. 1 is installed in an information processing device 300. The first memory unit 1 stores a value of a first coefficient included in a coefficient term based on a value of a first bit group included in operand data x of a first instruction flogad to calculate the value of the first coefficient in a case where a logarithmic function log(x) is decomposed into a series operation term and the coefficient term for the series operation term. Thus, the arithmetic processing device 100 may calculate the first coefficient by executing the first instruction flogad and referencing the first memory unit 1 without executing multiple instructions such as an instruction to transfer data, an instruction to compute bits, and a shift operation instruction.

The second memory unit 2 stores a value of a second coefficient included in the series operation term based on the value of the first bit group included in operand data x of a second instruction frad1 to calculate the value of the second coefficient. Thus, the arithmetic processing device 100 may calculate the second coefficient by executing the second instruction frad1 and referencing the second memory unit 2 without executing multiple instructions such as an instruction to transfer data, an instruction to compute bits, and a shift operation instruction. The selector 3 selects the value of the first coefficient read from the first memory unit 1 based on the execution of the first instruction flogad and selects the value of the second coefficient read from the second memory unit 2 based on the execution of the second instruction frad1.

For example, the arithmetic processing device 100 provides the second coefficient output from the selector 3 to a series expansion of a logarithmic function log(1+t) and calculates the value of the series operation term. The arithmetic processing device 100 calculates the value of the logarithmic function log(x) based on the calculated value of the series operation term and the first coefficient output from the selector 3. If the coefficient term for the series operation term includes a constant term, the arithmetic processing device 100 calculates the value of the constant term and calculates the value of the logarithmic function log(x) based on the calculated value of the constant term, the value of the series operation term calculated using the series expansion, and the first coefficient output from the selector 3. The value of the series operation term, the value of the constant term, and the value of the logarithmic function log(x) are calculated by a floating-point computing section (not illustrated) or the like.

In the embodiment illustrated in FIG. 1, the first and second coefficients may be calculated by referencing the first and second memory units 1 and 2 without the execution of multiple instructions. As a result, the logarithmic function log(x) may be computed using the series operation at a higher speed than conventional techniques.

Figure 2:
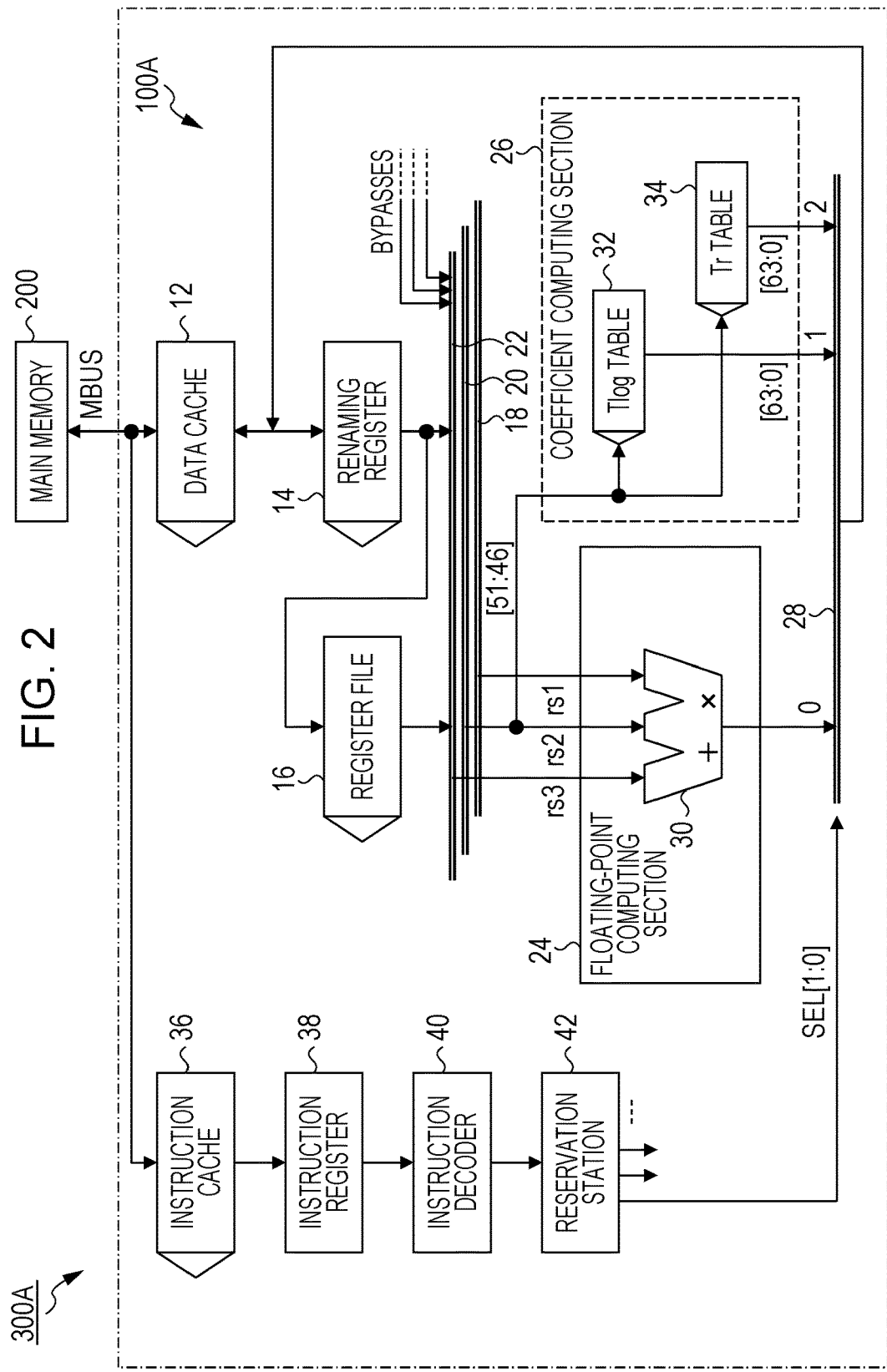
FIG. 2 is a diagram illustrating another embodiment of the arithmetic processing device and the method of controlling the arithmetic processing device.

FIG. 2 illustrates another embodiment of the arithmetic processing device and the method of controlling the arithmetic processing device. An arithmetic processing device 100A illustrated in FIG. 2 and a main memory 200 are installed in an information processing device 300A. The arithmetic processing device 100A includes a data cache 12, a renaming register 14, a register file 16, multiplexers 18, 20, and 22, a double-precision floating-point computing section 24, a double-precision coefficient computing section 26, and a multiplexer 28. The multiplexer 28 is an example of a selector. The floating-point computing section 24 includes a floating-point multiply-and-adder 30. The coefficient computing section 26 includes a T log table 32 and a Tr table 34. The T log table 32 is an example of the first memory unit, while the Tr table 34 is an example of the second memory unit. The arithmetic processing device 100A also includes an instruction cache 36, an instruction register 38, an instruction decoder 40, and a reservation station 42.

The data cache 12 is connected to the main memory 200 through a memory bus MBUS. The data cache 12 stores a part of data stored in the main memory 200 and has a function of writing the stored data back into the main memory 200.

The renaming register 14 has a predetermined number of entries for temporarily holding floating-point data output from the floating-point computing section 24 or from the coefficient computing section 26 or temporarily holding floating-point data transferred from the data cache 12. The floating-point data held in the entries of the renaming register 14 is transferred to the register file 16 upon retirement. By transferring the floating-point data (operand data) to the register file 16 through the renaming register 14, data anti-dependency and data output dependency that occur due to out-of-order execution are resolved.

The register file 16 has a predetermined number of entries for holding the floating-point data transferred from the renaming register 14 and to be processed by the floating-point computing section 24 or the coefficient computing section 26. Hereinafter, the floating-point data is also merely referred to as data.

In FIG. 2, an illustration of a part of wirings is omitted and each of the multiplexers 18, 20, and 22 selects any of data output from the renaming register 14, data output from the register file 16, and bypassed data and outputs the selected data to the floating-point computing section 24. Six bits [51:46] that are included in the operand data and supplied to the floating-point computing section 24 through the multiplexer 20 are also output to the coefficient computing section 26. The bypassed data is transferred from the data cache 12, the multiplexer 28, and the like. The multiplexers 18, 20, and 22 may cause the data to be bypassed from the sections other than the register file 16 and to be used for computation and resolve data hazards in an instruction pipeline for executing instructions.

The floating-point computing section 24 executes computation based on an instruction fetched by the arithmetic processing device 100A and outputs a result of executing the computation to the multiplexer 28. For example, the floating-point multiply-and-adder 30 executes a multiply and accumulate operations, namely to add a product of source data rs1 supplied through the multiplexer 18 and source data rs2 supplied through the multiplexer 20 to source data rs3 supplied through the multiplexer 22.

The coefficient computing section 26 operates in a case where the arithmetic processing device 100A executes an auxiliary instruction flogad to be used for the computation of a logarithmic function. The coefficient computing section 26 references the T log table 32 using the bits [51:46] of the source data rs2 and obtains floating-point data [63:0]. The bits [51:46] of the source data rs2 are a bit group of a part of the operand data of the auxiliary instruction flogad. The coefficient computing section 26 outputs, to the multiplexer 28, the floating-point data [63:0] output from the T log table 32. The floating-point data [63:0] output from the T log table 32 is used for a value of a coefficient included in any of multiple coefficient terms in a case where the logarithmic function log(x) is decomposed into a Taylor series operation term and the multiple coefficient terms for the Taylor series operation term. Formulas obtained by decomposing the logarithmic function log(x) into the Taylor series operation term and the multiple coefficient terms for the Taylor series operation term are expressed in the sixth and seventh rows of Equation (2) described later.

In addition, the coefficient computing section 26 operates in a case where the arithmetic processing device 100A executes the auxiliary instruction frad1 to be used for the computation of the logarithmic function. The coefficient computing section 26 references the Tr table 34 using the bits [51:46] of the source data rs2 and obtains 64-bit floating-point data [63:0]. The bits [51:46] of the source data rs2 is a bit group of a part of the operand data of the auxiliary instruction frad1. The coefficient computing section 26 outputs, to the multiplexer 28, the floating-point data [63:0] output from the Tr table 34. The floating-point data [63:0] output from the Tr table 34 is used for a value of any of multiple coefficients included in the Taylor series operation term in the case where the logarithmic function log(x) is decomposed into the Taylor series operation term and the multiple coefficient terms for the Taylor series operation term.

Figure 4:
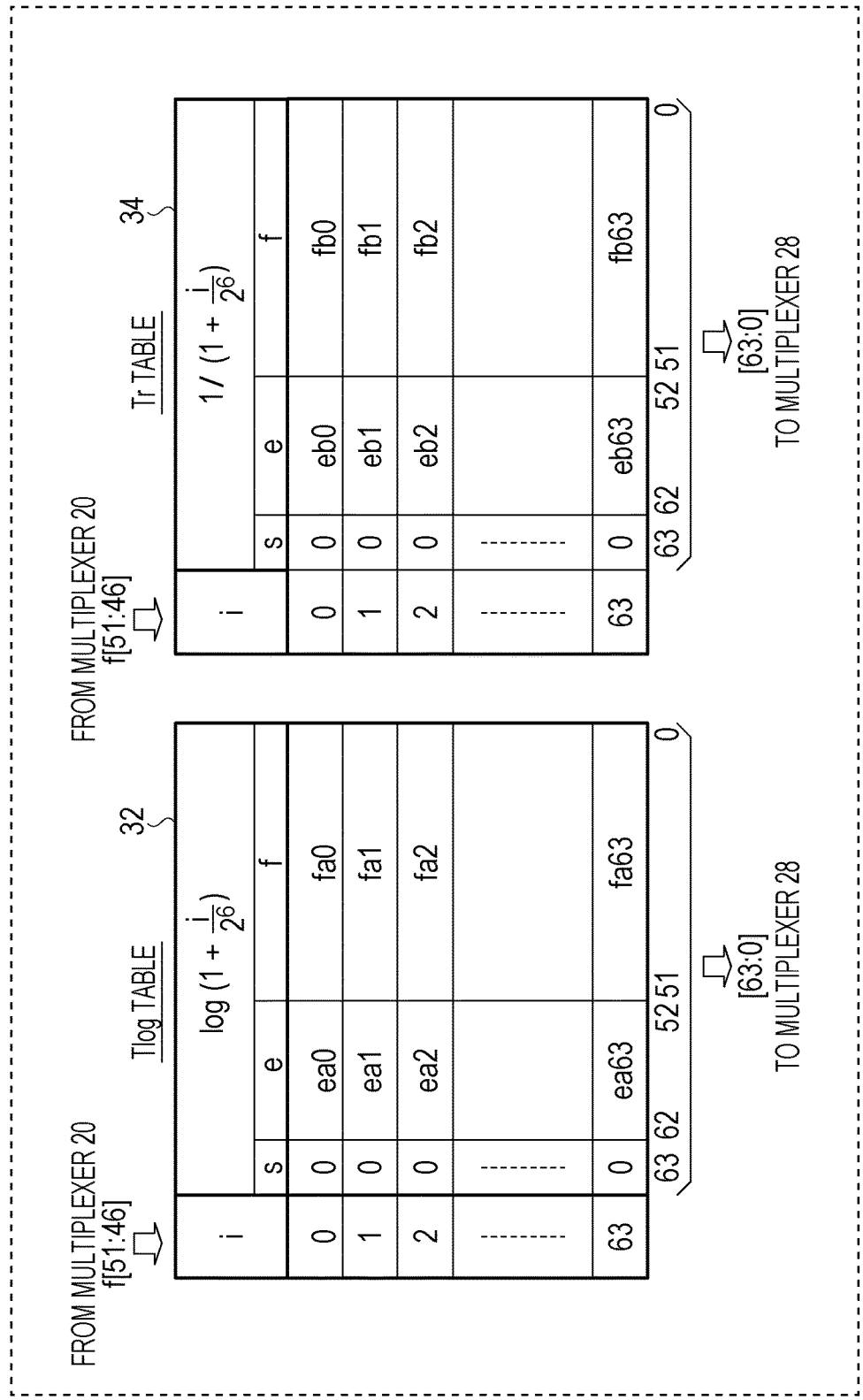
FIG. 4 is a diagram illustrating an example of a T log table and a Tr table that are illustrated in FIG. 2.

In this manner, the coefficient computing section 26 executes a process of calculating coefficients in the case where the logarithmic function log(x) is decomposed into the Taylor series operation term and the coefficient terms for the Taylor series operation term. The auxiliary instructions flogad and frad1 are provided in order to compute the logarithmic function using the series operation by the arithmetic processing device 100A at a higher speed than the conventional techniques. An example of the T log table 32 and the Tr table 34 is illustrated in FIG. 4. An example of the auxiliary instructions flogad and frad1 is described with reference to FIG. 5.

The multiplexer 28 selects any output of the floating-point computing section 24, the T log table 32, and the Tr table 34 in accordance with a 2-bit selection signal SEL [1:0] output from the reservation station 42 and outputs the selected output. If the selection SEL is set to "1", the multiplexer 28 selects the output of the T log table 32 and outputs the selected output. If the selection signal SEL is set to "2", the multiplexer 28 selects the output of the Tr table 34 and outputs the selected output. If the selection signal SEL is set to "0", the multiplexer 28 selects the output of the floating-point computing section 24 and outputs the selected output. The selection signal SEL is not set to "3".

The instruction cache 36 is connected to the main memory 200 through the memory bus MBUS. The instruction cache 36 stores a part of instructions stored in the main memory 200. The instruction register 38 fetches instructions from the instruction cache 36 and sequentially holds the fetched instructions. The instruction decoder 40 sequentially decodes the instructions held by the instruction register 38. The instruction decoder 40 has a function of decoding an operation instruction, an instruction to transfer data, and the like and a function of decoding the auxiliary instructions flogad and frad1.

The reservation station 42 accumulates the instructions decoded by the instruction decoder 40 and determines dependency relationships of the accumulated instructions. Then, the reservation station 42 selects an instruction to be executed, based on results of determining the dependency relationships and outputs control information to be used to execute the instruction to the renaming register 14, the register file 16, the floating-point computing section 24, the coefficient computing section 26, and the like. The control information output by the reservation station 42 includes register numbers, the selection signal SEL, and the like. Information to be used to generate the selection signal SEL [1:0] is generated by the instruction decoder 40 and registered together with register numbers included in the operation instruction and the like in the reservation station 42 upon instruction dispatch that makes available a resource to be used for the execution of instructions.

The coefficient computing section 26 may provide bits [51:46] of the source data rs1 or bits [51:46] of the source data rs3 to the T log table 32 or the Tr table 34 and obtain floating-point data [63:0].

Figure 3:
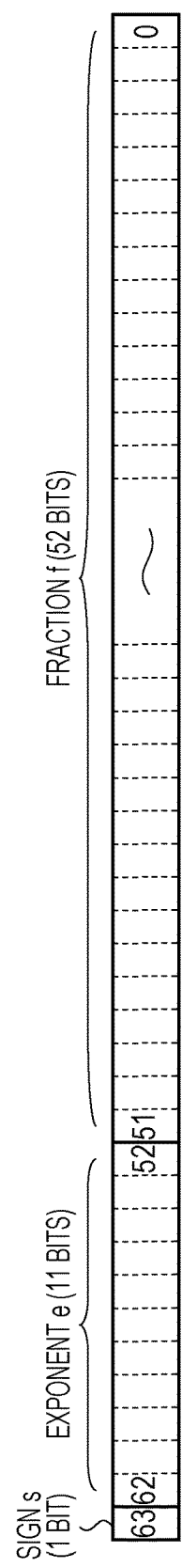
FIG. 3 is a diagram illustrating the IEEE 754 double-precision floating-point number format.

FIG. 3 illustrates the Institute of Electrical and Electronics Engineers (IEEE) 754 double-precision floating-point number format (floating-point number computation standard). In the IEEE 754 double-precision floating-point number format, a floating-point number is expressed by a single-bit value stored in a sign s, an 11-bit value stored in an exponent e, and a 52-bit value stored in a fraction f. If the sign s is "0", the sign s indicates a positive value. If the sign s is "1", the sign s indicates a negative value. The exponent e is a biased value obtained by adding 1023 to an actual value. The fraction f is a part after the decimal point and an integer "1" is omitted in the fraction f. The fraction f is a normalized value equal to or larger than 1 and smaller than 2. A value x expressed in the IEEE 754 double-precision floating-point number format is expressed by Equation (1).

$$x = (-1)^s \cdot 2^{(e-1023)} \cdot \left(1 + \frac{f}{2^{52}}\right) \quad (1)$$

Equation (2) expresses an example in which the logarithmic function log(x) is decomposed into the Taylor series operation term and the coefficient terms for the Taylor series operation term. In Equation (2), the base of the logarithm is a number "e (Napier's constant)".

$$\begin{aligned}
\log(x) &= \log\left\{(-1)^s \cdot 2^{(e-1023)} \cdot \left(1 + \frac{f}{2^{52}}\right)\right\} \quad (2)\\
&= \log\left\{\left(2^{(e-1023)}\right) \cdot \left(1 + \frac{f}{2^{52}}\right)\right\}\\
&= (e - 1023) \cdot \log(2) + \log\left(1 + \frac{f}{2^{52}}\right)\\
&= (e - 1023) \cdot \log(2) + \log\left(1 + \frac{f[51:46]}{2^6}\right) +\\
&\quad \log\frac{1 + \frac{f}{2^{52}}}{1 + \frac{f[51:46]}{2^6}}\\
&= (e - 1023) \cdot \log(2) + \log\left(1 + \frac{f[51:46]}{2^6}\right) +\\
&\quad \log\frac{1 + \frac{f[51:46]}{2^6} + \frac{f[45:0]}{2^{52}}}{1 + \frac{f[51:46]}{2^6}}\\
&= (e - 1023) \cdot \log(2) + \log\left(1 + \frac{f[51:46]}{2^6}\right) +\\
&\quad \log\left(1 + \frac{\frac{f[45:0]}{2^{52}}}{1 + \frac{f[51:46]}{2^6}}\right)\\
&= (e - 1023) \cdot \log(2) + \log\left(1 + \frac{f[51:46]}{2^6}\right) +\\
&\quad \log(1 + t)
\end{aligned}$$

In the case where the value x is expressed in the IEEE 754 double-precision floating-point number format, log(x) is expressed in the first row of Equation (2). Since the antilogarithm x of log(x) is a positive value, the first row of Equation (1) is deformed to the second row of Equation (2). The third row of Equation (2) is expressed by the addition of logarithms obtained from the logarithm expressed in the second row of Equation (2). In the third row of Equation (2), an exponent of the antilogarithm of the first term is expressed as a constant multiple of the logarithm.

In the fourth row of Equation (2), "1+f[51:46]/2^6" (a symbol ^ indicates a power) is multiplied by a denominator and a numerator that are expressed in the second term of the third row of Equation (2). The fourth row of Equation (2) is expressed by the addition of logarithms. Numbers in parentheses of "f[51:46]" indicate bit numbers of the fraction f. A formula "f/2^52" is expressed by Equation (3). Thus, if the formula "f/2^52" expressed in the fourth row of Equation (2) is replaced with the right side of Equation (3), the formula is expressed in the fifth row of Equation (2). In addition, when the third term of the fifth row of Equation (2) is deformed, the sixth row of Equation (2) is obtained.

$$\frac{f}{2^{52}} = \frac{f[51:46]}{2^6} + \frac{f[45:0]}{2^{52}} \quad (3)$$

If a formula "f[45:0]/2^52/(1+f[51:46]/2^6)" expressed in the third term of the sixth row of Equation (2) is replaced with t, the seventh row of Equation (2) is obtained. In the seventh row of Equation (2), the third term indicates the Taylor series operation term, and the first and second terms indicate the coefficient terms for the Taylor series operation term. A formula "(e−1023)·log(2)" expressed in the first term may be calculated by the floating-point multiply-and-adder 30. The value of log(2) is stored in the main memory 200 or the like and may be loaded in a register and thereby used.

Since the 6-bit f[51:46] may have 64 different values, log(1+f[51:46]/2^6)" expressed in the second term of the seventh row of Equation (2) may have 64 different values. Similarly, "1/(1+f[51:46]/2^6)" expressed in the third term of the sixth row of Equation (2) may have 64 different values. The formula "1/(1+f[51:46]/2^6)" is one of coefficients included in the Taylor series operation term. The arithmetic processing device 100A calculates "log(1+f[51:46]/2^6)" by referencing the T log table 32 and calculates "1/(1+f[51:46]/2^6)" by referencing the Tr table 34.

The coefficient "log(1+f[51:46]/2^6)" is expressed by a function T log of which a value is calculated by referencing the T log table 32, as expressed in Equation (4), while the function T log is calculated by the execution of the auxiliary instruction flogad. A symbol "i" expressed in Equation (4) is any of integers of "0" to "63" and indicates the bit value f[51:46]. The arithmetic processing device 100A inputs the fraction part f[51:46] into the T log table 32 based on the fetched auxiliary instruction flogad and calculates, as the value of the function T log, a value output from the T log table 32.

$$\log\left(1 + \frac{f[51:46]}{2^6}\right) = T\log[f[51:46]] \left(T\log[i] = \log\left(1 + \frac{i}{2^6}\right)\right) \quad (4)$$

In addition, the coefficient "1/(1+f[51:46]/2^6)" is expressed by a function Tr[i] of which a value is calculated by referencing the Tr table 34, as expressed in Equation (5), and the function Tr[i] is calculated by the execution of the auxiliary instruction frad1. The symbol "i" is any of the integers of "0" to "63" and indicates the bit value f[51:46]. The arithmetic processing device 100A inputs the fraction part f[51:46] into the Tr table 34 based on the fetched auxiliary instruction frad1 and outputs, as the value of the function Tr, a value read from the Tr table 34.

$$\frac{1}{1 + \frac{f[51:46]}{2^6}} = Tr[f[51:46]] \left(Tr[i] = \frac{1}{1 + \frac{i}{2^6}}\right) \quad (5)$$

Based on Equation (5), "t" (or "f[45:0]/2^52/(1+f[51:46]/2^60)") expressed in Equation (2) is expressed by Equation (6). In this case, since "f[45:0]" is a value in a range of "0" to "2^46−1", the maximum value of "f[45:0]/2^52" is smaller than "1/2^6". In addition, since "1/(1+f[51:46] 2/^6)" (or Tr1[f[51:46]] expressed in Equation (5)) is larger than 0.5 and equal to or smaller than 1, the maximum value of "1/(1+f[51:46]/2^52)" is "1". Thus, "t" is smaller than "1/2^6". Since "t<<1", "log(1+t)" expressed in the seventh row of Equation (2) may be calculated using the Taylor series operation with predetermined precision and expressed by a finite degree. For example, if the Taylor series operation is executed using up to a third-order term, the precision of "1/2^18" may be obtained.

$$t = \frac{\frac{f[45:0]}{2^{52}}}{1 + \frac{f[51:46]}{2^6}} = \frac{f[45:0]}{2^{52}} \cdot Tr[f[51:46]] < \frac{1}{2^6} \quad (6)$$

Equation (7) indicates a Taylor series expansion of the logarithmic function "log(1+t)".

$$\log(1 + t) = \sum_{n=1}^{\infty} (-1)^{(n-1)} \cdot \frac{1}{n} \cdot t^n \quad (7)$$

A symbol "n" expressed in Equation (7) is an integer of 1 or greater and is set based on precision requested for the computation. A symbol "t" expressed in Equation (7) may be computed by computing "f[45:0]/2^52" of the third term of the sixth row of Equation (2) by the floating-point computing section 24 and calculating "1/(1+f[51:46]/2^6)" of the third term of the sixth row of Equation (2) by the Tr table 34. Thus, "log(1+t)" may be computed by computing Equation (7) by the floating-point computing section 24 using the computed "t".

In addition, the first term of the seventh row of Equation (2) may be computed by the floating-point computing section 24. The value of log(2) is held as a constant in a register or the like before the execution of the computation. The second term of the seventh row of Equation (2) is calculated by referencing the T log table 32. Then, the logarithm log(x) is calculated by substituting "log(1+t)" calculated according to Equation (7) into the seventh row of Equation (2). As described above, "t" is smaller than "1/2^6". Thus, in Equation (7), if "n" is truncated to a certain finite degree, the precision of the calculated value of the logarithmic function log(x) is sufficient.

The above description is summarized below. The formula "(e−1023)−log(2)" expressed in the first term of the seventh row of Equation (2) is calculated using the floating-point computing section 24. The formula "log(1+f[51:46]/2^6)" expressed in the second term of the seventh row of Equation (2) is calculated by referencing the T log table 32 based on the auxiliary instruction flogad. The formula "f[45:0]/2^52" expressed in the third term of the sixth row of Equation (2) is calculated using the floating-point computing section 24. The formula "1/(1+f[51:46]/2^6)" expressed in the third term of the sixth row of Equation (2) is calculated by referencing the Tr table 34 based on the auxiliary instruction frad1. Thus, "t" expressed in the third term of the seventh row of Equation (2) is calculated using the floating-point computing section 24, and "log(1+t)" is calculated using Equation (7). Then, the value of the logarithmic function log(x) is calculated using the floating-point computing section 24 by summing the terms of the seventh row of Equation (2). Hereinafter, the auxiliary instructions flogad and frad1 are also merely referred to as instructions flogad and frad1.

FIG. 4 illustrates an example of the T log table 32 and the Tr table 34 that are illustrated in FIG. 2. The T log table 32 has 64 entries storing values of "log(1+f[51:46]/2^6)" expressed in the IEEE 754 double-precision floating-point number format in Equation (4), depending on the respective values of f[51:46]. Namely, the table 32 stores the respective values of T log for the respective values of f[51:46]. The coefficient computing section 26 provides the value f[51:46] supplied through the multiplexer 20 to a decoder for the T log table 32. The T log table 32 reads double-precision floating-point data [63:0] stored in an entry corresponding to a bit value i (any of values 0 to 63) expressed by the value f[51:46] received by the decoder. For example, if the value f[51:46] is "2", the sign s (=0), the exponent e (=ea2), and the fraction f (=fa2) are simultaneously output from the T log table 32. Then, the coefficient computing section 26 outputs the double-precision floating-point data [63:0] read from the T log table 32 to the multiplexer 28.

The Tr table 34 has 64 entries storing values of "1/(1+f [51:46]/2^6)" expressed in the IEEE 754 double-precision floating-point number format in Equation (5), depending on the values of f[51:46]. Namely, the table 34 stores the respective values of Tr for the respective values of f[51:46]. The coefficient computing section 26 provides the value f[51:46] supplied through the multiplexer 20 to a decoder for the Tr table 34. The Tr table 34 reads double-precision floating-point data [63:0] stored in an entry corresponding to a bit value i (any of the values 0 to 63) expressed by the value [51:46] received by the decoder.

For example, if the value f[51:46] is "1", the sign s (=0), the exponent e (=eb1), and the fraction f (=fb1) are simultaneously output from the Tr table 34. Then, the coefficient computing section 26 outputs the double-precision floating-point data [63:0] read from the Tr table 34 to the multiplexer 28.

Since the 64-bit double-precision floating-point data is stored in the T log table 32 and the Tr table 34, the coupling of the sign s, the exponent e output from the T log table 32, and the fraction f output from the T log table 32 may be omitted, for example. In addition, each of the T log table 32 and the Tr table 34 selects any of 64 entries based on the common 6-bit value f[51:46]. Specifically, the multiplexer 20 supplies the common 6-bit data to the T log table 32 and the Tr table 34. As a result, the number of wirings between the multiplexer 20 and the coefficient computing section 26 may be reduced, compared with a case where different 6-bit values are supplied to the T log table 32 and the Tr table 34. The supply of the common 6-bit value f[51:46] may contribute to a reduction in a chip size of the arithmetic processing device 100A.

In FIG. 4, each of the T log table 32 and the Tr table 34 selects any of 64 entries based on the 6-bit value f[51:46]. However, each of the T log table 32 and the Tr table 34 may select, based on an n-bit value f[m: m−(n−1)] (m is an integer of (n+1) or greater), any of entries whose number is 2 to the nth power. In this case, values of "log(1+i/2^n)" (i is a natural number that is equal to or larger than 0 and equal to or smaller than a value "2^n−1") are stored in the T log table 32, and values of "1/(1+i/2^n)" are stored in the Tr table 34.

For example, the values "n" and "m" (or the sizes of the T log table 32 and Tr table 34) are changed from states illustrated in FIG. 4 when the numbers of entries of the tables are increased and the number of the terms of the series operation are reduced. In addition, the values "n" and "m" are changed from the states illustrated in FIG. 4 when log(x) is calculated using data expressed in a single-precision or quadruple-precision floating-point number format. In other words, the arithmetic processing device 100A illustrated in FIG. 2 may compute data expressed in the single-precision or quadruple-precision floating-point number format.

FIG. 5 illustrates an example of instructions to calculate the values of the coefficients expressed in Equations (4) and (5). FIG. 5 illustrates instructions written in an assembly language. If the coefficient computing section 26 illustrated in FIG. 2 is used, the value of the coefficient expressed in Equation (4) may be calculated in accordance with the single instruction flogad. The operand data "x" of the instruction flogad is the antilogarithm x (double-precision floating-point data) of log(x) expressed in Equation (2) and is stored in a predetermined register. The result of computing the instruction flogad is stored in a register that is referred to as T log for a descriptive purpose.

Similarly, if the coefficient computing section 26 illustrated in FIG. 2 is used, the value of the coefficient expressed in Equation (5) may be calculated in accordance with the single instruction frad1. The operand data "x" of the instruction frad1 is the antilogarithm (double-precision floating-point data) of log(x) expressed in Equation (2) and is stored in a predetermined register. The result of computing the instruction frad1 is stored in a register that is referred to as Tr1 for a descriptive purpose.

If the coefficient computing section 26 is not used, each of the coefficients expressed in Equations (4) and (5) is calculated by the execution of five instructions. If the coefficients expressed in Equations (4) and (5) are calculated without the coefficient computing section 26, A T log table and a Tr table that have the same configurations of the T log table 32 and Tr table 34 illustrated in FIG. 3 are assigned on a memory space.

If the coefficient expressed in Equation (4) is calculated without the coefficient computing section 26, the antilogarithm x (held in the double-precision floating-point register) of log(x) expressed in Equation (2) is stored in a memory region at a predetermined memory address indicated by [ ] in accordance with an instruction stdf to store a floating-point number. Next, in accordance with an instruction Idx to load a fixed floating point, the antilogarithm x held at the predetermined memory address indicated by [ ] is loaded into a fixed-point register that is referred to as Xi for a descriptive purpose.

Next, in order to acquire the 6-bit value [51:46] on the top side of the fraction f in the double-precision floating-point number format from the antilogarithm x loaded in the fixed-point register Xi, a shift instruction srlx is executed. In accordance with the shift instruction srlx, the data held in the fixed-point register Xi is shifted by 43 bits ("46−3" bits) toward the lower side, and a value obtained by the shifting is stored in a register that is referred to as T log e for a descriptive purpose.

The shift instruction srlx is executed to calculate offset values from the top address of the T log table assigned on the memory space. Each of the 64 entries of the T log table has 64 bits (8 bytes), the offset values are provided at intervals of 8 bytes. Thus, in accordance with the shift instruction srlx, the data is shifted by "46−3" bits obtained by subtracting 3 bits corresponding to an address value from 46 bits for 8 bytes.

Next, in order to clear bit values other than the target 6 bits (from a bit 8 to a bit 3), an AND instruction and is executed. In accordance with the AND instruction and, a logical product of a value held by the register T log e and a value (or "1f8" in hexadecimal notation) obtained by shifting "3f" expressed in hexadecimal notation by 3 bits toward the upper side is computed, and the result of the computation is stored in a register that is referred to as T log o for a descriptive purpose. The value stored in the register T log o indicates an offset value from the top address of the T log table assigned on the memory space. Then, an instruction lddf to load a floating point is executed and the value of a coefficient held in any of the entries of the T log table assigned on the memory space is stored in a floating-point register that is referred to as T log for a descriptive purpose. In accordance with the load instruction lddf, the offset value stored in the register T log o is added to a base address (stored in a register that is referred to as T log b for a descriptive purpose) that is the top address of the T log table, and an address of an entry holding the value of the coefficient to be read is calculated.

If the coefficient expressed in Equation (5) is calculated without the coefficient computing section 26, instructions that are the same as or similar to the instructions used to compute the coefficient expressed in Equation (4) without the coefficient computing section 26 are executed, except that registers to be used and a table from which the coefficient is read are different from those used in the case where the coefficient expressed in Equation (4) is computed without the coefficient computing section 26. If the coefficient expressed in Equation (5) is calculated without the coefficient computing section 26, the Tr table assigned on the memory space is used.

As illustrated in FIG. 5, if the values of the coefficients are calculated by a combination of conventional instructions without the use of the coefficient computing section 26, arithmetic processes such as a logical operation and a shift operation are executed using a fixed-point computing section. Thus, not only an operation instruction but also a store instruction and a load instruction that are to be executed to transfer data between a floating-point register and a fixed-point register are executed. Since the multiple instructions are executed to compute the logarithmic function, the processing performance of the arithmetic processing device 100A may be reduced. On the other hand, if the coefficients are calculated using the coefficient computing section 26, the number of instructions to be executed is reduced by 4, compared with the case where the floating-point computing section 24 is used. As a result, a reduction in the processing performance of the arithmetic processing device 100A due to the execution of the computation of the logarithmic function may be suppressed.

Figure 6:
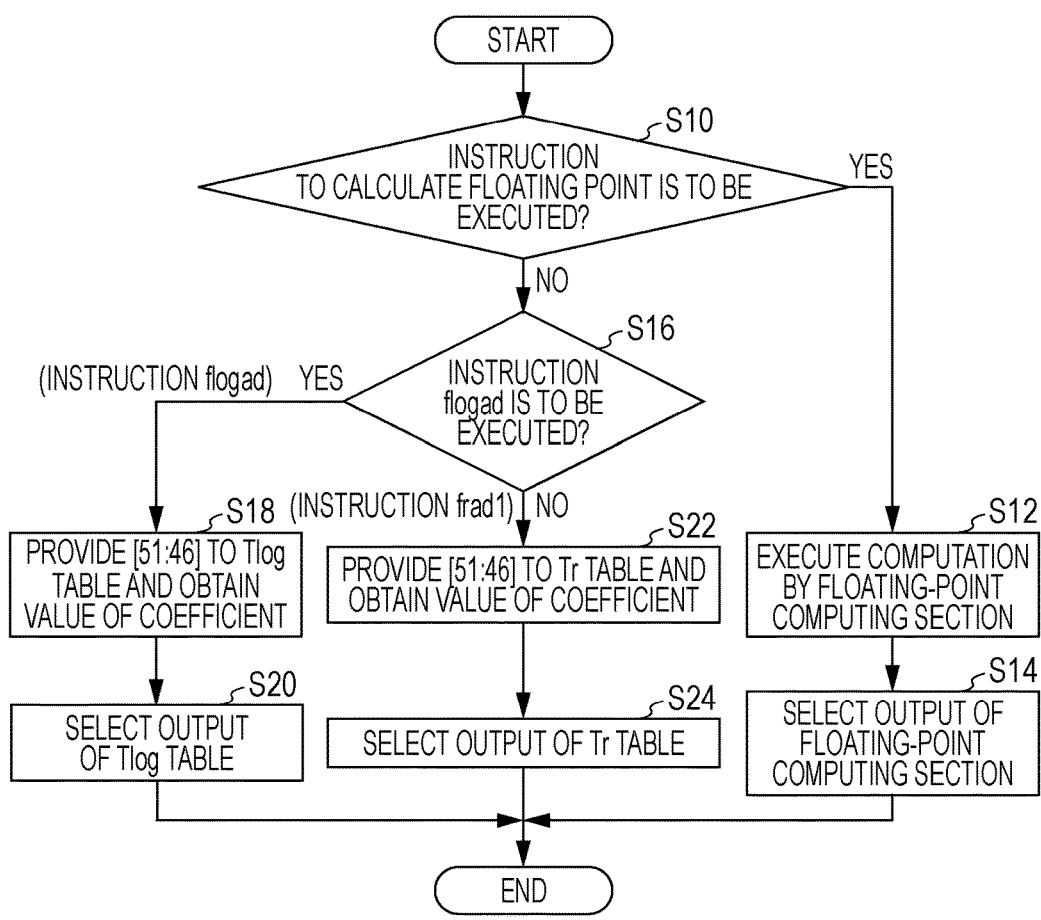
FIG. 6 is a diagram illustrating an example of an operation of the arithmetic processing device illustrated in FIG. 2.

FIG. 6 illustrates an example of an operation of the arithmetic processing device 100A illustrated in FIG. 2. FIG. 6 illustrates the operation in a case where the arithmetic processing device 100A fetches an instruction to compute a floating-point number or fetches the instruction flogad or frad1 for a coefficient.

If the arithmetic processing device 100A executes the instruction to compute the floating-point number in step S10, the operation proceeds to step S12. If the arithmetic processing device 100A executes the instruction flogad or frad1, the operation proceeds to step S16.

In step S12, the floating-point computing section 24 executes the computation based on floating-point data received from the multiplexers 18, 20, and 22 and outputs the result of the computation to the multiplexer 28. Next, in step S14, the multiplexer 28 selects the output of the floating-point computing section 24 and outputs the result of the computation by the floating-point computing section 24.

If the arithmetic processing device 100A executes the instruction flogad in step S16, the operation proceeds to step S18. If the arithmetic processing device 100A executes the instruction frad1 in step S16, the operation proceeds to step S22.

In step S18, the coefficient computing section 26 provides, to the T log table 32, the upper bits [51:46] of the fraction f among the floating-point data received from the multiplexer 20. Then, the coefficient computing section 26 reads, from the T log table 32, the floating-point data [63:0] indicating the value of the coefficient expressed in Equation (4) and outputs the read value to the multiplexer 28. In step S20, the multiplexer 28 selects output of the T log table 32 and outputs the result of computing the coefficient by the coefficient computing section 26.

In step S22, the coefficient computing section 26 provides, to the Tr table 34, the upper bits [51:46] of the fraction f among the floating-point data received from the multiplexer 20. Then, the coefficient computing section 26 reads, from the Tr table 34, the floating-point data [63:0] indicating the value of the coefficient expressed in Equation (5) and outputs the read value to the multiplexer 28. In step S24, the multiplexer 28 selects output of the Tr table 34 and outputs the result of computing the coefficient by the coefficient computing section 26.

In the embodiment illustrated in FIGS. 2 to 6, the logarithmic function may be computed using the series operation at a higher speed than the conventional techniques, like the embodiment illustrated in FIG. 1. Specifically, the value of the coefficient expressed in Equation (4) may be computed by the execution of the single instruction flogad, and the value of the coefficient expressed in Equation (5) may be computed by the execution of the single instruction frad1. As a result, the logarithmic function may be computed in accordance with a smaller number of instructions than the conventional techniques, and a reduction in the processing performance of the arithmetic processing device 100A due to the execution of the computation of the logarithmic function may be suppressed.

In the embodiment illustrated in FIGS. 2 to 6, the 6-bit value f[51:46] that is common to the T log table 32 and the Tr table 34 is supplied from the multiplexer 20 to the coefficient computing section 26. Thus, the number of wirings between the multiplexer 20 and the coefficient computing section 26 may be reduced, compared with the case where different 6-bit values are supplied to the T log table 32 and the Tr table 34. The supply of the common 6-bit value f[51:46] may contribute to a reduction in the chip size of the arithmetic processing device 100A. In addition, the coupling of the sign s, the exponent e output from the T log table 32, and the fraction f output from the T log table 32 may be omitted by storing all 64 bits of the double-precision floating-point data in the T log table 32 and the Tr table 34, for example.

Figure 7:
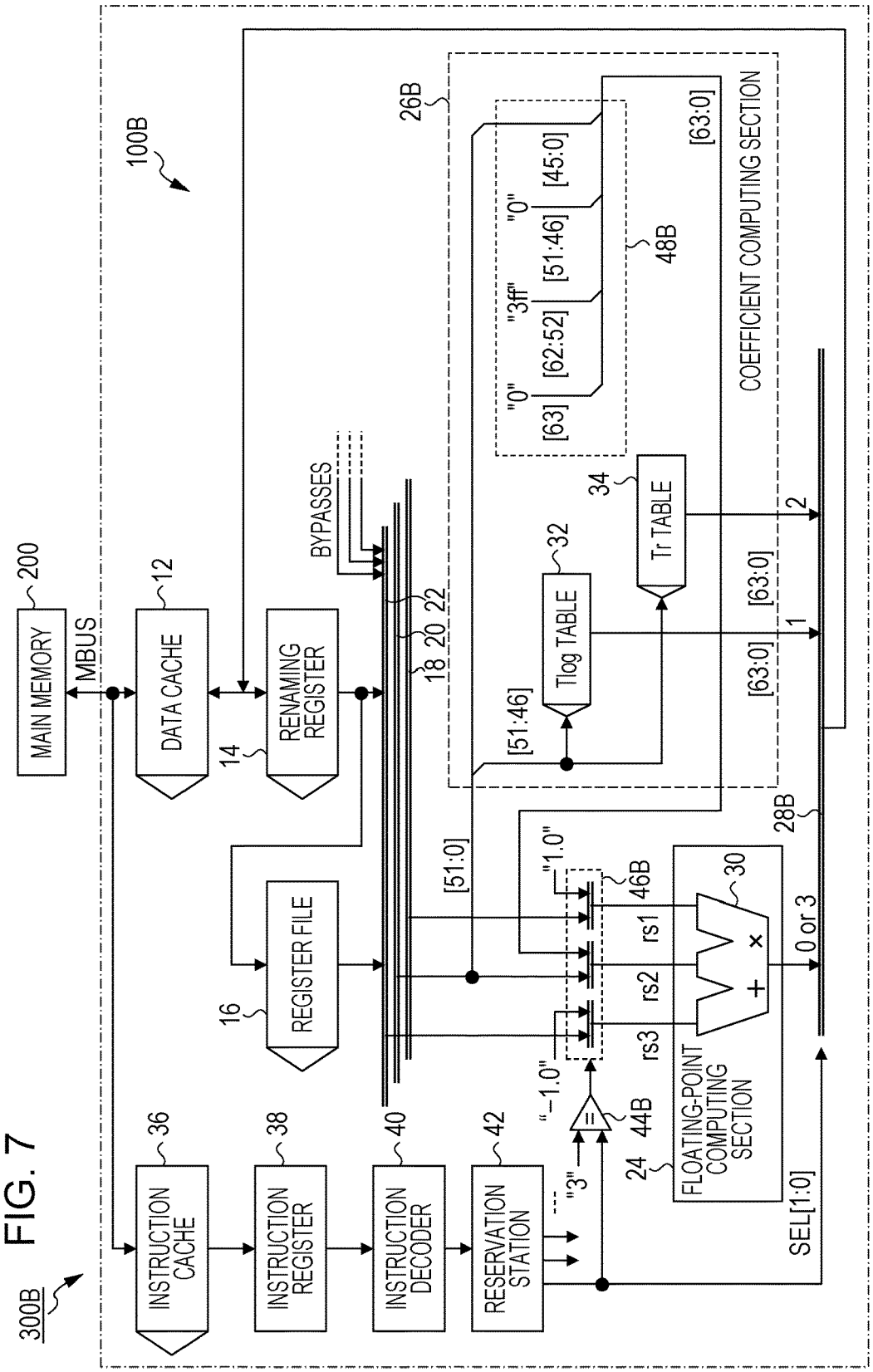
FIG. 7 is a diagram illustrating another embodiment of the arithmetic processing device and the method of controlling the arithmetic processing device.

FIG. 7 illustrates another embodiment of the arithmetic processing device and the method of controlling the arithmetic processing device. Elements that are the same as or similar to the elements described in the embodiment illustrated in FIG. 2 are indicated by the same reference numerals and symbols as those illustrated in FIG. 2, and a detailed description thereof is omitted.

An arithmetic processing device 100B illustrated in FIG. 7 and the main memory 200 are installed in an information processing device 300B. The arithmetic processing device 100B includes a double-precision coefficient computing section 26B and a multiplexer 28B, instead of the coefficient computing section 26 and the multiplexer 28 that are illustrated in FIG. 2. The arithmetic processing device 100B also includes a comparator 44B and a multiplexer 46B. In the arithmetic processing device 100B, configurations other than the coefficient computing section 26B, the multiplexer 28B, the comparator 44B, and the multiplexer 46B are the same as or similar to those of the arithmetic processing device 100A illustrated in FIG. 2.

The coefficient computing section 26B is configured by adding a bit coupling section 46B to the coefficient computing section 26 illustrated in FIG. 2. If the arithmetic processing device 100B executes an auxiliary instruction frad2 to be used for the computation of a logarithmic function, the bit coupling section 48B couples bits [63:46] with bits [45:0] supplied to the coefficient computing section 26B and thereby generates 64-bit floating-point data. In this case, the bit coupling section 48B couples the bits [45:0] with a bit [63]=0, bits [62:52]=3ff (in hexadecimal notation), and bits [51:46]=0.

If the selection signal SEL indicates "3", the comparator 44B outputs, to the multiplexer 46B, the selection signal that selects right-side input of the multiplexer 46B illustrated in FIG. 7. If the selection signal SEL indicates a value other than "3", the comparator 44B outputs, to the multiplexer 46B, the selection signal that selects left-side input of the multiplexer 46B illustrated in FIG. 7. If the selection signal SEL indicates "3", the multiplexer 46B outputs "1.0", a bit value [63:0] output from the bit coupling section 48B, and "−1.0" as source data rs1, rs2, and rs3 to the floating-point computing section 24. In this case, "1.0", the bit value [63:0] output from the bit coupling section 48B, and "−1.0" are double-precision floating-point data. Thus, if the selection signal SEL indicates "3", the floating-point computing section 24 subtracts "1.0" from the bit value [63:0] output from the bit coupling section 48B. On the other hand, if the selection signal SEL indicates a value other than "3", the multiplexer 46B outputs data output from the multiplexers 18, 20, and 22 as the source data rs1, rs2, and rs3 to the floating-point computing section 24.

If the selection signal SEL indicates "3", the bit coupling section 48B, the comparator 44B, the multiplexer 46B, and the floating-point computing section 24 function in order to calculate "f[45:0]/2^52" expressed in Equation (6). In order to acquire the value f[45:0] on the lower side of the fraction that is included in the double-precision floating-point data and is a part of the data after the decimal point, the sign s is set to "0", the exponent e is set to "3ff" indicating the "0th power", and the value f[51:46] on the upper side of the fraction is set to "0". In addition, since the implicit integral value "1" is omitted in the fraction f of the double-precision floating-point data, the floating-point computing section 24 subtracts "1.0" from a value obtained by multiplying the floating-point data [63:0] from the bit coupling section 48B by "1.0" and thereby removes the implicit value "1". Thus, the value indicated by "f[45:0]/2^52" expressed in Equation (6) is calculated.

Since the bit coupling section 48B, the comparator 44B, and the multiplexer 46B are installed, the value of "f[45:0]/2^52" expressed in Equation (6) may be calculated in accordance with the single instruction frad2. Operands of the instruction frad2 are "x, Tr2", similarly to the operands of the instruction frad1 illustrated in FIG. 5. A symbol "x" is the antilogarithm x (double-precision floating-point data) of log(x) expressed in Equation (2) and is stored in a predetermined register. A symbol "Tr2" indicates a register for storing the result of computing the instruction frad2. The bit coupling section 48B, the comparator 44B, the multiplexer 46B, and the floating-point computing section 24 are an example of a coefficient calculator configured to calculate "f[45:0]/2^52" expressed in Equation (6) based on the value of the bit group [45:0] included in operand data x of the instruction frad2. This value of "f[45:0]/2^52" corresponds to a third coefficient, in this disclosure.

If the bit coupling section 48b, the comparator 44B, and the multiplexer 46B are not installed, "f[45:0]/2^52" is calculated by an AND operation and an OR operation. In this case, "f[45:0]/2^52" is calculated using multiple instructions, like the instructions to be used when the floating-point computing section 24 described with reference to FIG. 5 and the fixed-point computing section are used.

The multiplexer 28B selects any output of the floating-point computing section 24, the T log table 32, and the Tr table 34 in accordance with the selection signal SEL and outputs the selected output. The selection signal SEL is set to "3" based on the fact that the arithmetic processing device 100A determined the execution of the auxiliary instruction frad2. If the selection signal SEL indicates "0" or "3", the multiplexer 28B selects the output of the floating-point computing section 24. Operations of the multiplexer 28B are the same as or similar to the operations of the multiplexer 28 illustrated in FIG. 2, except that the multiplexer 28B selects the output of the floating-point computing section 24 if the selection signal SEL indicates "3".

Instead of the comparator 44B and the multiplexer 46B, a subtractor for double-precision floating-point data may be installed and connected to output of the bit coupling section 48B. In this case, the subtractor removes the implicit value "1" by subtracting "1.0" from the floating-point data [63:0] output from the bit coupling section 48B. Then, the multiplexer 28B selects output of the subtractor if the selection signal SEL indicates "3".

In the embodiment illustrated in FIG. 7, the logarithmic function may be computed at a higher speed than the conventional techniques, like the embodiments illustrated in FIGS. 1 to 6. In the embodiment illustrated in FIG. 7, the bit coupling section 48B, the comparator 44B, the multiplexer 46B, and the floating-point computing section 24 calculate "f[45:0]/2^52" expressed in Equation (6) based on the single instruction frad2. Thus, the logarithmic function may be computed using the series operation at a high speed. As a result, the logarithmic function may be computed with a smaller number of instructions than the conventional techniques, and a reduction in the processing performance of the arithmetic processing device 100B due to the computation of the logarithmic function may be suppressed.

Figure 8:
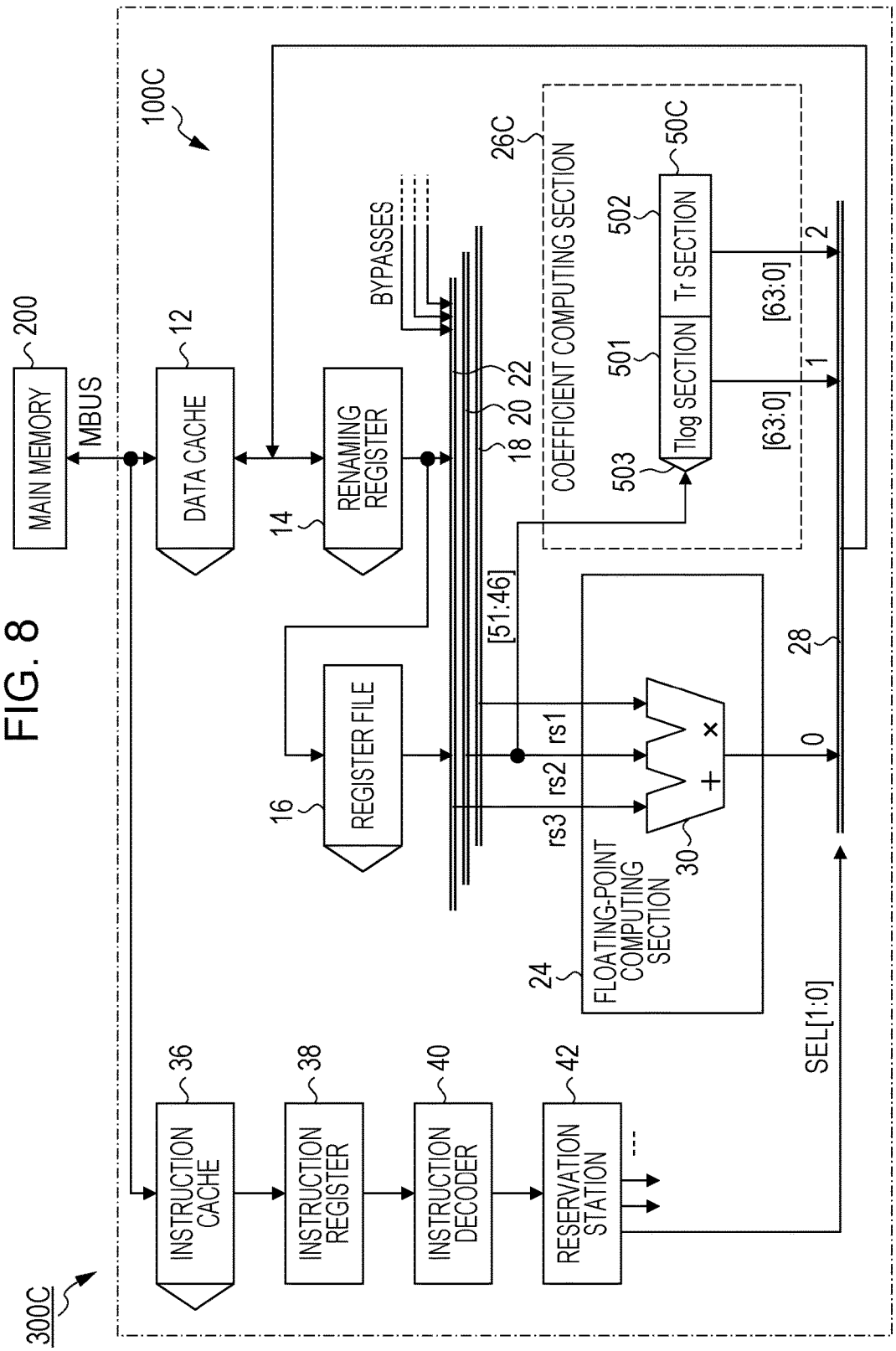
FIG. 8 is a diagram illustrating another embodiment of the arithmetic processing device and the method of controlling the arithmetic processing device.

FIG. 8 illustrates another embodiment of the arithmetic processing device and the method of controlling the arithmetic processing device. Elements that are the same as or similar to the elements described in the embodiment illustrated in FIG. 2 are indicated by the same reference numerals and symbols as those illustrated in FIG. 2, and a detailed description thereof is omitted.

An arithmetic processing device 100C illustrated in FIG. 8 and the main memory 200 are installed in an information processing device 300C. The arithmetic processing device 100C includes a coefficient computing section 26C, instead of the coefficient computing section 26 illustrated in FIG. 2.

In the arithmetic processing device 100C, configurations other than the coefficient computing section 26C are the same as or similar to those of the arithmetic processing device 100A illustrated in FIG. 2.

The coefficient computing section 26C includes a coefficient table 50C. The coefficient table 50C has a T log section 501 including the information stored in the T log table 32 illustrated in FIG. 4, a Tr section 502 including the information stored in the Tr table 34 illustrated in FIG. 4, and a decoder 503 that is common to the T log section 501 and the Tr section 502. The T log section 501 is an example of the first memory unit, while the Tr section 502 is an example of the second memory unit. The coefficient table 50C is an example of a coefficient memory unit.

The decoder 503 selects any of 64 entries included in the T log section 501 and any of 64 entries included in the Tr section 502 based on a value of a bit group [51:46] from the multiplexer 20. Then, the coefficient table 50C outputs double-precision floating-point data [63:0] from the T log section 501 and the Tr section 502.

In FIG. 2, in the coefficient computing section 26, the T log table 32 and the Tr table 34 have the decoders for decoding the bit group [51:46], respectively. The coefficient table 50C has the decoder 503 for decoding the bit group [51:46] for both T log section 501 and Tr section 502. Thus, a circuit size for the coefficient table 50C may be smaller than a circuit size for the T log table 32 and Tr table 34 illustrated in FIG. 2.

In the embodiment illustrated in FIG. 8, the logarithmic function may be computed using the series operation at a higher speed than the conventional techniques, like the embodiments illustrated in FIGS. 1 to 7. In the embodiment illustrated in FIG. 8, the circuit size for the coefficient table 50C may be smaller than the circuit size for the T log table 32 and Tr table 34 illustrated in FIG. 2. The coefficient computing section 26B illustrated in FIG. 7 may include the coefficient table 50C illustrated in FIG. 8, instead of the T log table 32 and the Tr table 34.

Figure 9:
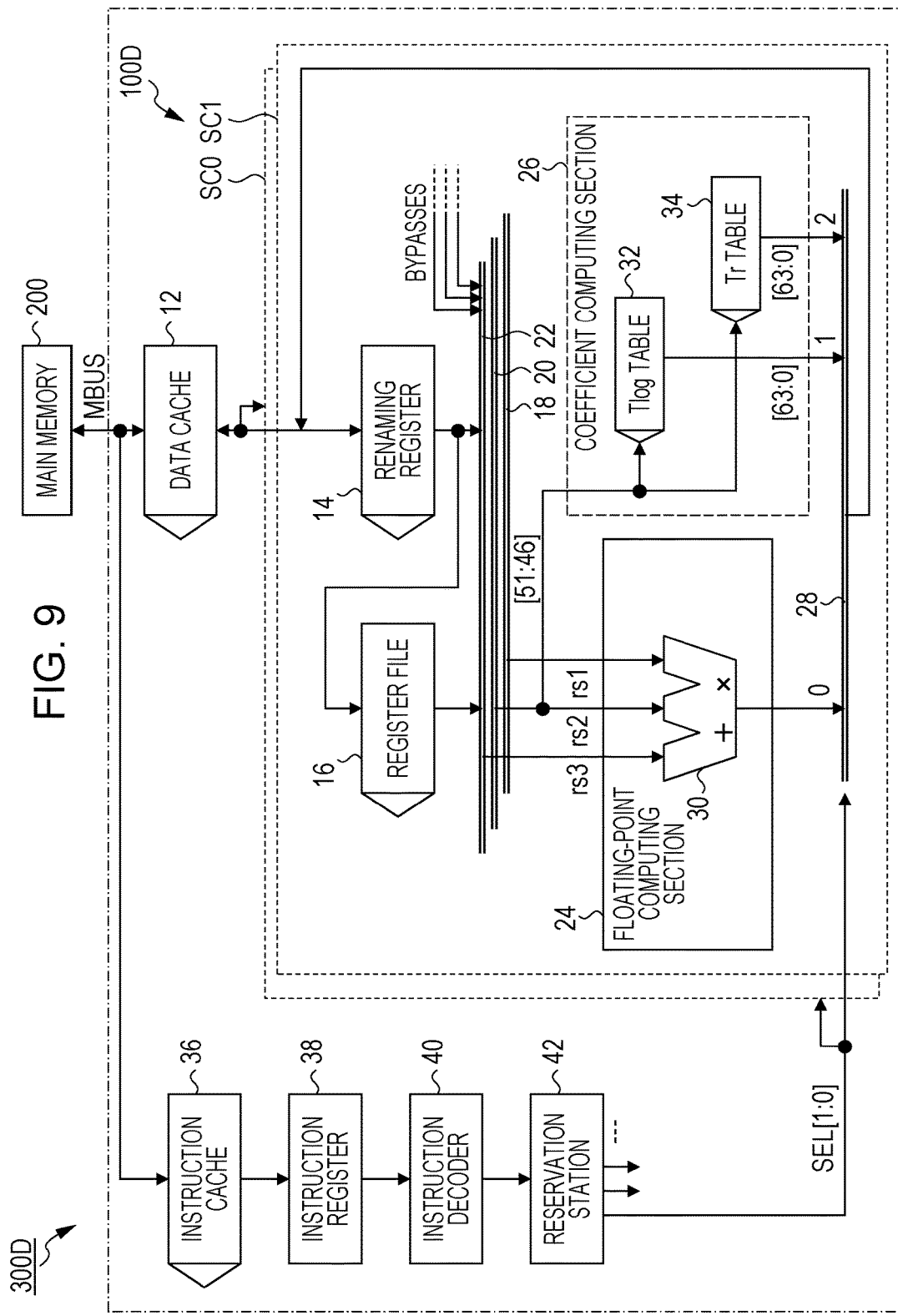
FIG. 9 is a diagram illustrating another embodiment of the arithmetic processing device and the method of controlling the arithmetic processing device.

FIG. 9 illustrates another embodiment of the arithmetic processing device and the method of controlling the arithmetic processing device. Elements that are the same as or similar to the elements described in the embodiment illustrated in FIG. 2 are indicated by the same reference numerals and symbols as those illustrated in FIG. 2, and a detailed description thereof is omitted.

An arithmetic processing device 100D illustrated in FIG. 9 and the main memory 200 are installed in an information processing device 300D. The arithmetic processing device 100D includes single instruction multiple data (SIMD) computing sections SC (SC0 and SC1) configured to simultaneously execute computation based on a single instruction. The data cache 12, the instruction cache 36, the instruction register 38, the instruction decoder 40, and the reservation station 42 are common to the SIMD computing sections SC0 and SC1. Each of the SIMD computing sections SC0 and SC1 has the renaming register 14, the register file 16, the multiplexers 18, 20, and 22, the floating-point computing section 24, the coefficient computing section 26, and the multiplexer 28 that are illustrated in FIG. 2. The data cache 12 is connected to the SIMD computing sections SC0 and SC1. Control information (including the selection signal SEL [1:0]) output from the reservation station 42 is supplied to the SIMD computing sections SC0 and SC1.

The arithmetic processing device 100D may include four SIMD computing sections SC or eight SIMD computing sections. In addition, each of the SIMD computing sections SC may have the coefficient computing section 26B illustrated in FIG. 7 and the multiplexer 28B illustrated in FIG. 7, instead of the coefficient computing section 26 and the multiplexer 28. In this case, the arithmetic processing device 100D includes the comparator 44B and the multiplexer 46B that are illustrated in FIG. 7. In addition, each of the SIMD computing sections SC may have the coefficient computing section 26C illustrated in FIG. 8 and the multiplexer 28C illustrated in FIG. 8, instead of the coefficient computing section 26 and the multiplexer 28.

In the embodiment illustrated in FIG. 9, effects that are the same as or similar to the effects obtained in the embodiments illustrated in FIGS. 1 to 8 may be obtained.

The features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An arithmetic processing device comprising:
a first memory configured to store values of a first coefficient of a logarithmic function where the logarithmic function is decomposed into a series operation term and the coefficient term for the series operation term depending on respective values of a first bit group included in operand data of a first instruction to calculate the value of the first coefficient;
a second memory configured to store values of a second coefficient included in the series operation term depending on the respective values of the first bit group included in operand data of a second instruction to calculate the value of the second coefficient; and
a selector, coupled to the first memory and the second memory, configured to select the value of the first coefficient read from the first memory based on an execution of the first instruction and select the value of the second coefficient read from the second memory based on an execution of the second instruction.

2. The arithmetic processing device according to claim 1, wherein the first memory stores, as values of the first coefficient, values of "$\log(1+i/2^n)$" ($\hat{}$ indicates a power and n indicates the number of bits of the first bit group) so that the stored values are associated with values i (i indicates natural numbers) of the first bit group of a fraction of the operand data included in the first instruction and expressed in a floating-point format, and
wherein the second memory stores, as values of the second coefficient, values of "$1/(1+i/2^n)$" so that the stored values are associated with the values i of the first bit group of a fraction of the operand data included in the second instruction and expressed in the floating-point format.

3. The arithmetic processing device according to claim 2, wherein the first memory stores values of a sign, exponent, and fraction of the first coefficient expressed in the floating-point format so that the stored values are associated with the values i of the first bit group and outputs the value of the stored sign, the value of the stored exponent, and the value of the stored fraction based on the first instruction, and wherein the second memory stores values of a sign, exponent, and fraction of the second coefficient expressed in the floating-point format so that the stored values are associated with the values i of the first bit group and outputs the value of the stored sign, the value of the stored exponent, and the value of the stored fraction based on the second instruction.

4. The arithmetic processing device according to claim 2, wherein the first bit group is n bits on the upper side of each of the fractions of the input data.

5. The arithmetic processing device according to claim 1, further comprising
a coefficient calculator configured to calculate a value of a third coefficient included in the series operation term based on a value of a second bit group included in operand data of a third instruction to calculate the value of the third coefficient,
wherein the selector selects the value of the third coefficient calculated by the coefficient calculator based on an execution of the third instruction.

6. The arithmetic processing device according to claim 1, further comprising
a coefficient memory that includes the first memory, the second memory unit, and a decoder that is common to the first memory and the second memory and configured to select, based on the value of the first bit group, one of values of the first coefficient stored in the first memory and one of values of the second coefficient stored in the second memory.

7. The arithmetic processing device according to claim 1, further comprising
a multiply-and-adder configured to execute a multiply and accumulate operations,
wherein the selector selects an operation result output from the multiply-and-adder based on a multiply-and-add instruction executed by the multiply-and-adder.

8. A method of controlling an arithmetic processing device, comprising:
causing a coefficient computing section included in the arithmetic processing device to read, from a first memory, a value of a first coefficient included in a coefficient term of a logarithmic function where the logarithmic function is decomposed into a series operation term and the coefficient term for the series operation term, based on a value of a first bit group included in operand data of a first instruction to calculate the value of the first coefficient, and to read, from a second memory, a value of a second coefficient included in the series operation term based on the value of the first bit group included in operand data of a second instruction to calculate the value of the second coefficient; and
causing a selector included in the arithmetic processing device to select the value of the first coefficient read from the first memory based on an execution of the first instruction and select the value of the second coefficient read from the second memory based on an execution of the second instruction.

* * * * *